(12) United States Patent
Smithson et al.

(10) Patent No.: US 6,336,606 B1
(45) Date of Patent: Jan. 8, 2002

(54) SPOOL FOR A SEAT BELT RETRACTOR

(75) Inventors: Alan Smithson; David Blackadder, both of Carlisle; Joseph Harte, Maryport, all of (GB)

(73) Assignee: Breed Automotive Technology, Inc., Lakeland, FL (US)

(*) Notice: Subject to any disclaimer, the term of this patent is extended or adjusted under 35 U.S.C. 154(b) by 4 days.

(21) Appl. No.: 09/602,142

(22) Filed: Jun. 23, 2000

(30) Foreign Application Priority Data

Sep. 17, 1999 (GB) .............................................. 9922108

(51) Int. Cl.7 .......................... B60R 22/28; B60R 22/36; B65H 75/28
(52) U.S. Cl. .................. 242/376; 242/379.1; 242/587.1
(58) Field of Search .............................. 242/379.1, 376, 242/587.1; 280/805, 806; 297/478

(56) References Cited

U.S. PATENT DOCUMENTS 5,722,611 A     3/1998  Schmid et al. .............. 242/376
5,984,223 A  *  11/1999 Hiramatsu ................ 242/379.1
6,202,957 B1 *  3/2001  Bannert et al. ............. 242/376

FOREIGN PATENT DOCUMENTS

DE       2556409      6/1977
EP       0894681      7/1998

* cited by examiner

Primary Examiner—John M. Jillions
(74) Attorney, Agent, or Firm—Lonnie Drayer; Jarrett Rieger

(57) ABSTRACT

A spool for a seat belt retractor has a cylindrical member with a cylindrical central portion and two end plates at opposite axial ends of the cylindrical portion. There is a channel formed in the cylindrical central portion with an outer and an inner wall and defining a path for guiding seat belt webbing. The path circumscribes the spool axis substantially over the length of the central portion of the spool in a generally smooth curve. The path has a spool entry and a spool exit portion and an acute angle subtended at the spool axis by the entry portion of the path and the exit portion of the path is approximately 90°. The spool may be hollow with a torsion bar forming the inner wall of the channel.

10 Claims, 6 Drawing Sheets

SPOOL FOR A SEAT BELT RETRACTOR

FIELD OF THE INVENTION

The present invention relates to spool for a seat belt retractor.

BACKGROUND OF THE INVENTION

A seat belt safety restraint generally comprises belt webbing wound on a spool that is mounted for rotation about its longitudinal axis to wind in or pay out webbing. The spool is biased in a winding-in direction by a spiral spring. A sensor detects a crash, for example by detecting acceleration or deceleration over a predetermined level. The sensor then activates a locking mechanism to lock the spool against rotation and prevent further pay out of webbing thus restraining the occupant against forward motion.

During manufacturing of a retractor the belt webbing is usually threaded onto the spool through a slot in its core. A strong steel webbing pin is sewn into the end of the webbing to prevent the end pulling through the slot.

However it has been found that under extreme conditions, the pin can cause the spool to weaken and break along the line of the slot. This is a particular problem in more modern spools, which are often made of aluminum to take advantage of its lightness.

One way to spread the load exerted by the webbing is to use two slots in the spool. The webbing is passed in one direction through a first slot, and then back, in the opposite direction through the other generally parallel slot. In this way the webbing imposed forces are spread over a greater area of the spool and the spool can withstand higher tensile loads.

However, this form of construction for the spool is more difficult to assemble and production time is increased, with attendant increased costs. The double threading motion is difficult to automate and generally this step in assembly is found to be the slowest part of a spool assembly production line.

The present invention provides an improved retractor spool arrangement with faster assembly times.

DETAILED DESCRIPTION OF THE INVENTION

Figure 1:
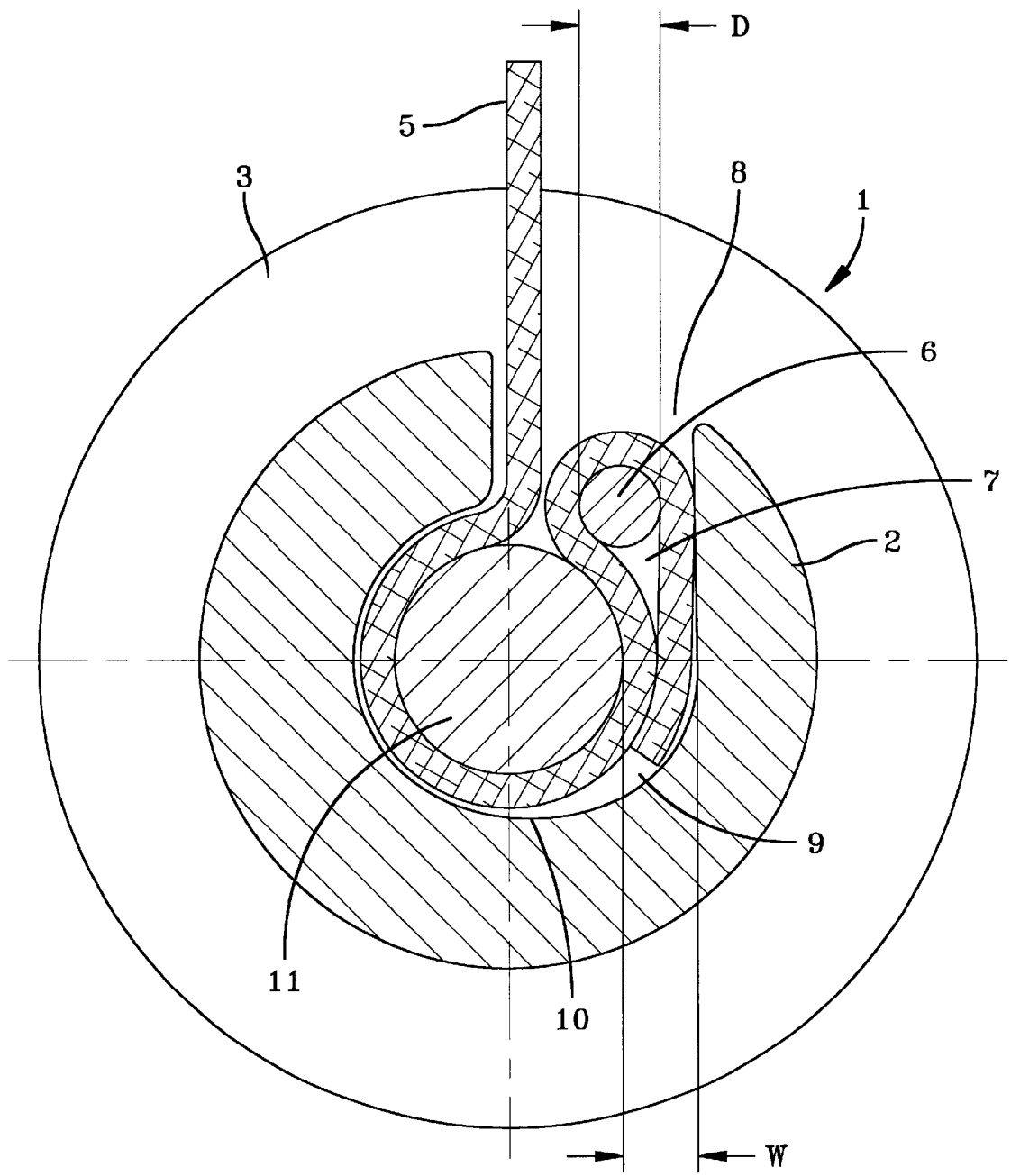
FIG. 1 is a cross-sectional view of a spool constructed according to one embodiment of the first aspect of the invention.

In each of FIGS. 1 to 4 a spool 1 is shown comprising a cylindrical plastic central body portion 11 and end wings 3, 4 which, in use, laterally constrain seat belt webbing 5 which is wound around the central body 2 on spool 1. The spool is formed as a single piece, for example by die-casting.

A metal, preferably steel, pin 6 is sewn into a loop 7 in one end of the webbing. A slot 8 is formed in the cylindrical body portion 2 of the spool 1 and the pin 6 sits in this slot so as not to interfere with the generally smooth outer surface of the spool 1 as presented to the wound webbing. The webbing 5 passes from the pin 6 through a channel 9 around the central axis of the spool and exits via the slot 8. Channel 9 has an outer wall 10, which is configured so as to guide the webbing 5 around the channel and out of the slot without additional intervention from a production line operative. To this end the wall 10 is made smooth with a minimum of abrupt corners and may be costed with a friction reducing material. The outer part of the wall, which leads into the channel 9, follows a smooth arc with no discontinuities. The channel 9 may subscribe a parabolic path and the angle subtended at the spool axis by the entry and exit parts of the channel is less than 180° and preferably about 90°.

The pin 6 has a diameter "D" larger than the width "W" of channel 9 so that it is not pulled right through the channel.

The central section 11 of the spool 1, around which the webbing 5 coils, is a metal torsion bar in these embodiments.

Figure 2:
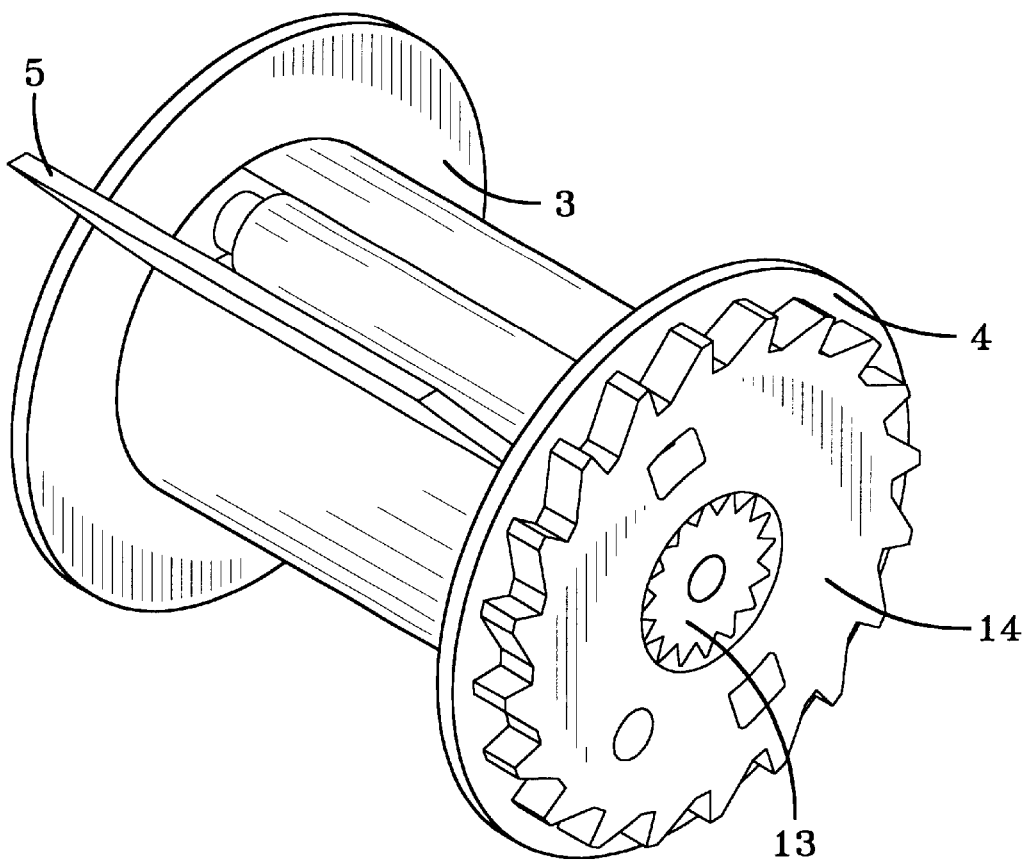
FIG. 2 is a perspective view of the spool of FIG. 1.
Figure 3:
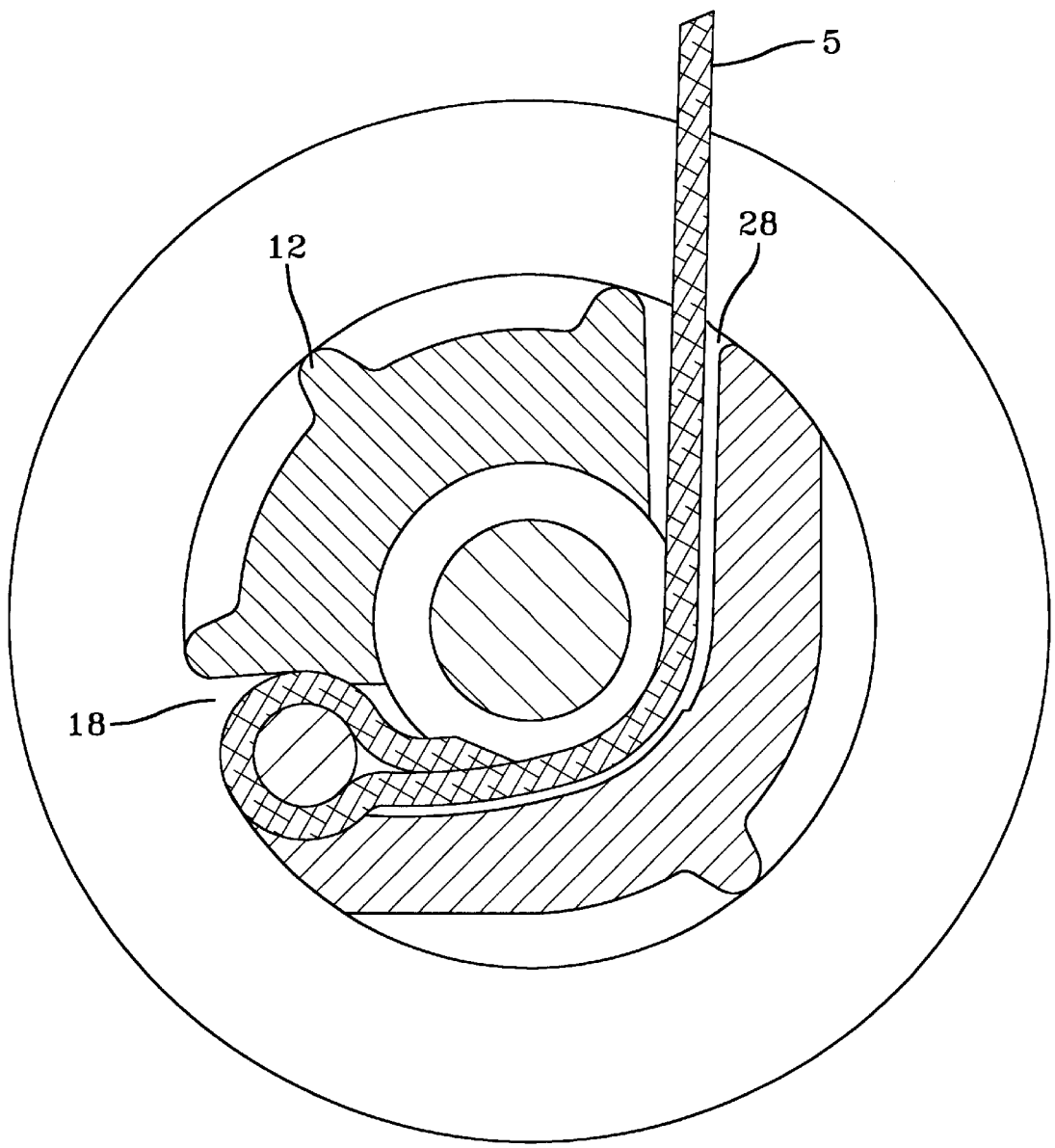
FIG. 3 is a cross-sectional view of a spool constructed according to a second embodiment of the first aspect of the invention.
Figure 4:
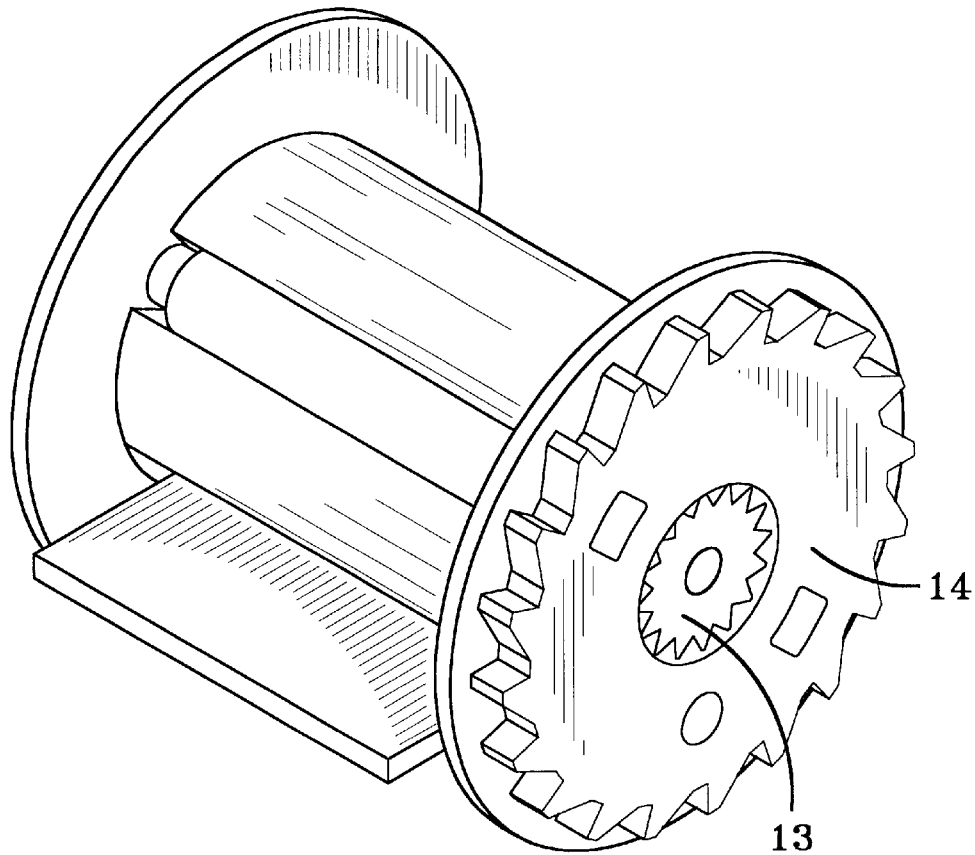
FIG. 4 is a perspective view of the spool of FIG. 3.
Figure 5:
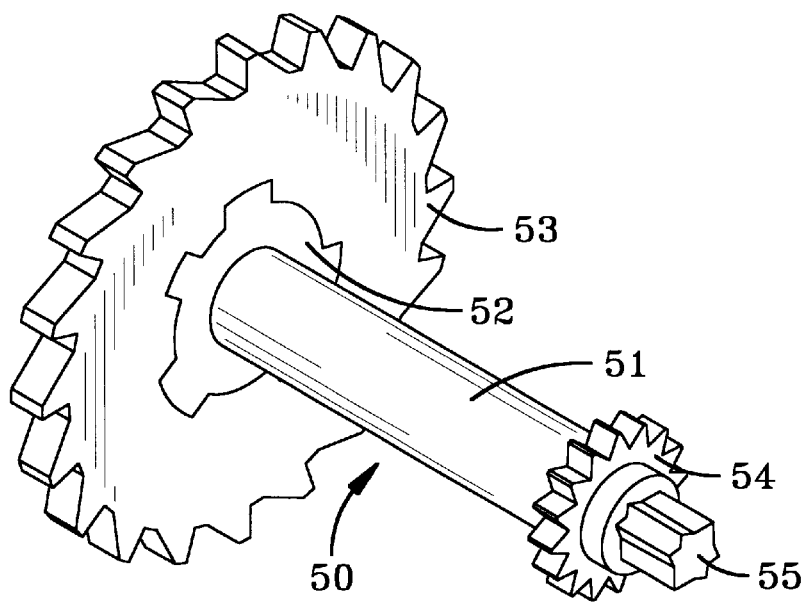
FIG. 5 is a perspective view of a torsion bar according to the third aspect of the present invention.

In the embodiment shown in FIG. 3 the angle between the line of the webbing passing into the channel 9 and the line exiting, is slightly greater than in FIG. 1 but is less than 180° and is about 90°. In this embodiment there are two slots 18, 28 separated by a segment 12 of spool 1. This double slot arrangement makes the webbing tend to run more smoothly on insertion through the channel 9. In FIGS. 2 and 4, the whole spool can be seen more clearly including a geared end 13 of the torsion bar and a ratchet wheel 14, which is attached to one end of the spool 1. The ratchet wheel 14 is engaged by a pawl (not shown) activated by a crash sensor to lock the spool in a crash situation.

FIGS. 5 to 9 illustrate a torsion bar according to the third aspect of the invention. The torsion bar shown generally as 50 comprises a cylindrical portion 51 which widens at one end to form a ratchet wheel engaging member 52, with a cut-out, or notched, outer periphery which engages ratchet wheel 53.

At the other end of the cylindrical portion 51 of the torsion bar 50 is a spool coupling gear 54 and a spring drive coupling 55.

Figure 6:
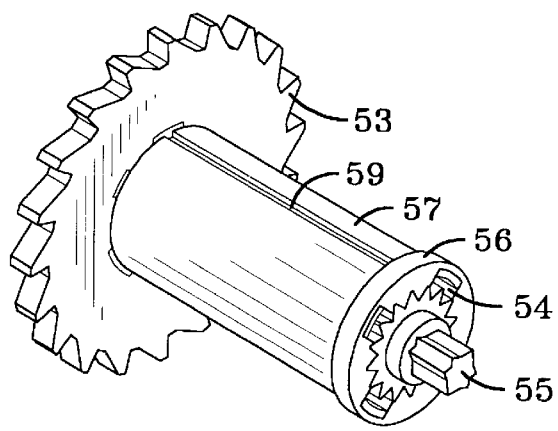
FIG. 6 is a perspective view of a spool sub-assembly incorporating the torsion bar of FIG. 5.

In FIG. 6 the torsion bar 50 is shown assembled in a spool sub-assembly and to that effect a spool coupling ring 56 is mounted on the spool coupling gear 54. A spool sleeve 57 surrounds the torsion bar 50 axially and rests on a spool bearing 58 at the ratchet wheel end, and in a recess in the spool coupling ring 56 at the spool coupling end where it engages the spool gear 54.

The spool sleeve 57 is a plastic, generally simple, rolled tubular sleeve with a narrow slot 59 for receiving and holding an end of the seat belt webbing. One end is coupled, as shown, to the torsion bar 50 via spool gear 54. It is much simpler and cheaper to construct than the traditional spool, which must be die-cast to withstand the load bearing requirements.

Figure 7:
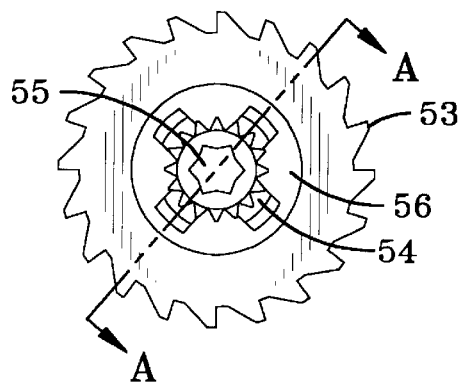
FIG. 7 is an end view of the spool sub-assembly of FIG. 6, from one end.

Typically the torsion bar 50 might have a 9mm diameter and the wider end, ratchet wheel engaging portion 52, a diameter of 22–25mm. FIG. 7 shows the spool sub-assembly of FIG. 6 from the spool engaging end showing the ratchet wheel 53 and the ratchet engaging part 52 at the distance end, and showing the spring drive coupling 55, and the spool gear 54 and the near end. The spool coupling ring 56 is also shown.

Figure 8:
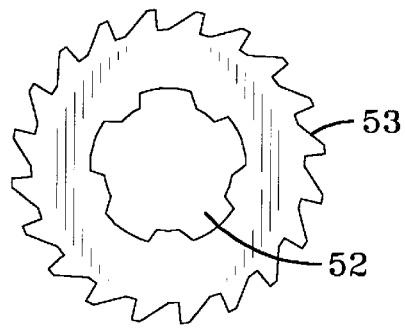
FIG. 8 is an end view of the spool sub-assembly of FIG. 6 from the other end.

FIG. 8 shows the spool sub-assembly of FIG. 6 from the ratchet engaging ends and shows the ratchet wheel 53 and the ratchet engaging part 52.

Figure 9:
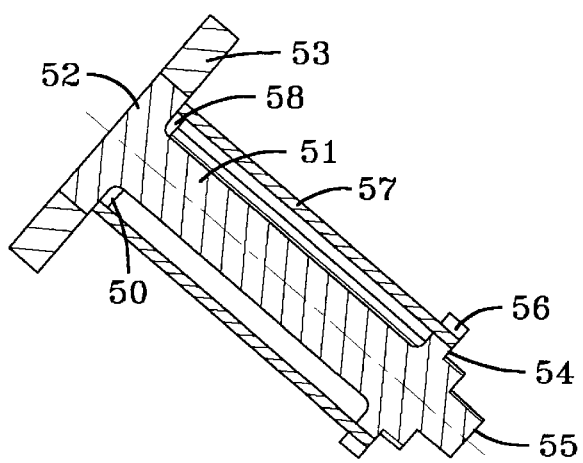
FIG. 9 is a cross-sectional view along line A—A of FIG. 7.

FIG. 9 is a cross-section of FIG. 7 along lines A—A and like parts are denoted by like references. It can be clearly seen that the spool sleeve 57 rests on spool bearing 58 at one end and co-operates with spool coupling 54 and coupling ring 56 to engage the torsion bar 50 at its other end.

Figure 10:
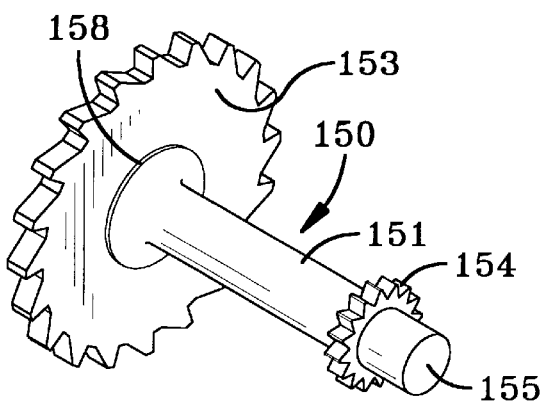
FIG. 10 is a perspective view of a torsion bar according to the fourth aspect of the present invention.
Figure 11:
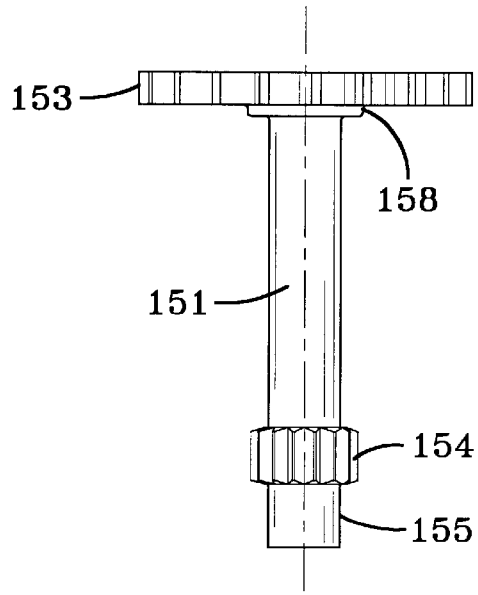
FIG. 11 is a side view of the torsion bar of FIG. 10.
Figure 12:
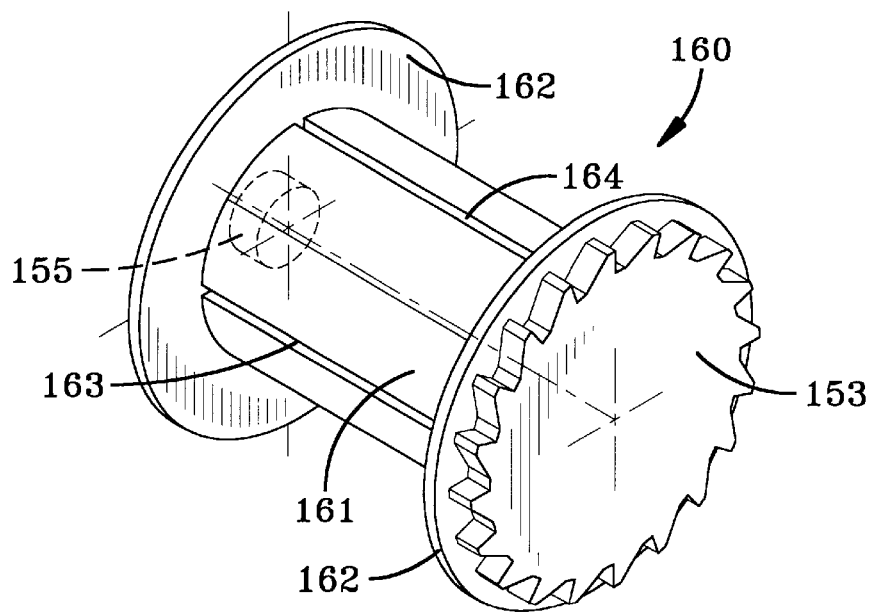
FIG. 12 is a perspective view of a spool sub-assembly incorporating the torsion bar of FIGS. 10 and 11.

FIGS. 10, 11 and 12 illustrate a torsion bar according to the fourth aspect of the invention, which is a one-piece torsion bar 150 incorporating torsion bar body 151, a ratchet wheel portion 153, a spool coupling 154 and a spring coupling 155.

A bearing shoulder 158 is provided on which a spool sleeve can rest to form a spool sub-assembly (in the same way as illustrated in FIGS. 5 to 9). Alternatively, the torsion bar 150 may be used with a traditional die cast aluminum spool 160 as shown in FIG. 12. This spool has a main cylindrical body portion 161 and side plates or wings 162. The entry and exit slots 163, 164 for seat belt webbing to be anchored in the spool are marked in FIG. 12 and are about 90° apart, as shown.

It is understood that the invention is not limited to the particular construction and arrangement of parts herein illustrated and described, but embraces such modified forms thereof as come within the scope of the following claims.

We claim:

1. A spool for a seat belt retractor comprising:

a cylindrical member having a cylindrical central portion and two end plates at opposite axial ends of the cylindrical central portion, the cylindrical central portion having a channel formed therein;

the channel having an outer and an inner wall and defining a path for guiding seat belt webbing which path circumscribes the axis of the spool substantially over the length of the central portion of the spool in a generally smooth curve; and the path having a webbing entry and a webbing exit portion, and an included angle subtended at the axis of the spool by the entry portion of the path and the exit portion of approximately 90°, wherein the spool comprises a first and a second slot, the webbing passes from the pin in the first slot through the channel and exits the spool at the second slot.

2. The spool for a seat belt retractor as claimed in claim 1 wherein the curve is a parabolic arc.

3. The spool for a seat belt retractor as claimed in claim 1 wherein the outer wall of the channel has a smooth surface.

4. The spool as for a seat belt retractor claimed in claim 3 wherein the outer wall is coated with a friction reducing material.

5. The spool for a seat belt retractor as claimed in claim 1 wherein the spool is formed as a hollow shell.

6. The spool as for a seat belt retractor claimed in claim 5 wherein the inner wall of the channel comprises the outer surface of a torsion bar.

7. The spool for a seat belt retractor as claimed in claim 1 wherein the section of the spool lying between the portion of the channel entering the spool and that leaving, is cut away.

8. A spool as claimed in claim 1 further comprising a torsion bar for a vehicle safety restraint comprising an elongate rod having a central part with an inherent plastic deformation characteristic, first means at one end for engaging a retractor spool and second means at the other opposite end for engaging a locking pawl in the event of a crash, wherein the second means comprising an end portion of the torsion bar with an integrally formed radially extending ratchet wheel having ratchet teeth formed about its periphery adapted for engaging the locking pawl.

9. A spool as claimed in claim 8, wherein the torsion bar further comprises an integrally formed bearing shoulder extending axially inwardly from the ratchet wheel for supporting a spool body.

10. A torsion bar according to claim 8, wherein the first means further comprises a spring drive coupling.

* * * * *